US011989118B1

(12) United States Patent
Sutton et al.

(10) Patent No.: US 11,989,118 B1
(45) Date of Patent: May 21, 2024

(54) TEST CASE GENERATION USING FINGERPRINTING

(71) Applicant: Amazon Technologies, Inc., Seattle, WA (US)

(72) Inventors: Michael Sutton, Seattle, WA (US); Zhongwei Yao, Vancouver (CA); Kevin Kwon, Vancouver (CA); Andrew Evenson, Seattle, WA (US); Ruoshi Li, Richmond (CA)

(73) Assignee: Amazon Technologies, Inc., Seattle, WA (US)

( * ) Notice: Subject to any disclaimer, the term of this patent is extended or adjusted under 35 U.S.C. 154(b) by 45 days.

(21) Appl. No.: 17/541,967

(22) Filed: Dec. 3, 2021

(51) Int. Cl.
*G06F 9/44* (2018.01)
*G06F 11/36* (2006.01)

(52) U.S. Cl.
CPC .................. *G06F 11/3672* (2013.01)

(58) Field of Classification Search
None
See application file for complete search history.

(56) References Cited

U.S. PATENT DOCUMENTS

| | | | | |
|---|---|---|---|---|
| 8,209,549 B1* | 6/2012 | Bain, III | ............. | G06Q 20/382 |
| | | | | 705/64 |
| 9,794,160 B1* | 10/2017 | Felstaine | ................ | H04L 43/50 |
| 10,339,038 B1* | 7/2019 | Singh | ................. | G06F 11/3688 |
| 10,963,366 B2* | 3/2021 | Hicks | ................. | G06F 11/3684 |
| 2008/0086660 A1* | 4/2008 | Wefers | ............... | G06F 11/3688 |
| | | | | 714/E11.219 |
| 2009/0204591 A1* | 8/2009 | Kaksonen | .......... | G06F 11/3684 |
| | | | | 717/124 |
| 2015/0058680 A1* | 2/2015 | Kortti | ................ | G06F 11/3684 |
| | | | | 714/47.2 |
| 2015/0379430 A1* | 12/2015 | Dirac | .................... | G06N 20/00 |
| | | | | 706/12 |
| 2018/0081955 A1* | 3/2018 | Gupta | .................... | G06F 16/27 |

* cited by examiner

*Primary Examiner* — Wei Y Zhen
*Assistant Examiner* — Lanny N Ung
(74) *Attorney, Agent, or Firm* — Eversheds Sutherland (US) LLP

(57) ABSTRACT

Systems, devices, and methods are provided for fingerprinting requests, such as transaction records. A transaction record or other suitable request may be parsed to identify a parameter values for a set of fields relevant to fingerprinting. A transaction record representation may be generated based on transaction input data, transaction output data, intermediate data, or combinations thereof. A fingerprint may be generated from the transaction record implementation. Fingerprints may be used to identify various test cases that can be used for regression testing.

18 Claims, 8 Drawing Sheets

TEST CASE GENERATION USING FINGERPRINTING

BACKGROUND

Creating, managing, and validating test cases for software functionality is challenging. In many cases, tests are created in an ad hoc or post hoc manner to accommodate different possible test cases that may be encountered by the software in a production setting. There are many difficulties that arise from managing testing and validation in such an ad hoc manner. For example, when software systems have external dependencies, it may be difficult to identify when new test cases need to be generated. Furthermore, maintaining existing test cases can be complicated by changes to external dependencies such that a failure in a test case could be due to a change in expected behavior (e.g., due to a dependency change) or may be truly due to a defect that should be fixed.

In highly regulated industries, software may be expected to comply with certain regulatory or legal requirements. Laws and regulations frequently change, making it difficult to create, manage, and validate test cases for software functionality for which compliance is required. Accordingly, there is a need for better testing capabilities to comply with laws and regulations that may apply to software, such as software hosted by a cloud service provider.

Figure 1:
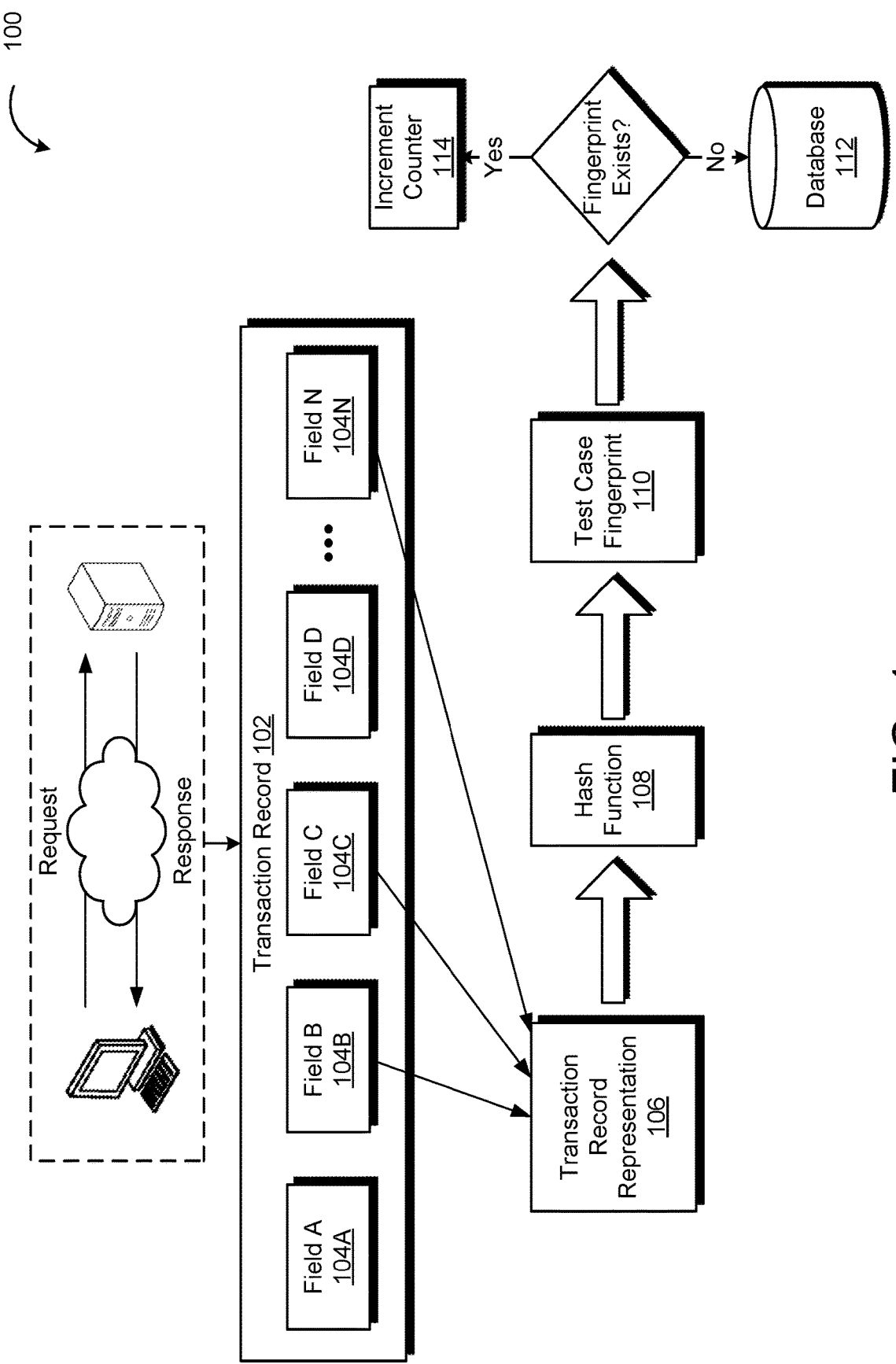
FIG. 1 illustrates a computing environment in which a test case fingerprint is generated, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Example embodiments described herein provide certain systems, methods, and devices for predictive test case generation using fingerprints.

Techniques described herein may be used to generate unique test cases for transaction records. Network traffic of transactions in a production environment may be recorded, batched, and uploaded to a network-accessible data store. A notification or event may be generated when transaction records are uploaded to the network-accessible data store. In response to the notification, a container or other compute resource may be provisioned and launched to generate unique test case fingerprints for the transaction records.

A transaction record may be processed in the following manner: a transaction record is obtained. The transaction record may include a record of network traffic related a transaction, such as a transaction request that was sent and a transaction response. In various embodiments, fields of the transaction request and/or response and corresponding parameter values are stored in the transaction record, allowing for a transaction to be replayed via the transaction record.

A set of fields of the transaction record relevant to fingerprinting may be identified. For example, if a fingerprint for tax calculation tests is being generated, fields such as the shipping address may be relevant to test, but a field for customer ID may be irrelevant to the calculation as it is irrelevant for tax calculation purposes whether a first user or second user is making a purchase.

Parameter values corresponding to the set of fields may be extracted from the transaction record. For example, this may include a shipping address value or shipping address id that is resolved as an intermediate value (e.g., jurisdiction). This may be used to reduce the cardinality of the shipping address field. The parameter values may be concatenated or otherwise joined to produce a transaction record representation.

The transaction record representation may be used to generate a test case fingerprint. For example, a hash function may receive the transaction record representation as a hash input and produce, as a hash output, a test case fingerprint. If two transaction records produce the same fingerprint, it means that they are testing the same dimensions and that it may be considered redundant to validate both. In various embodiments, a database of unique test cases is generated. When a test case fingerprint is computed, it may be used to query a database of test cases to determine whether another transaction record with the same fingerprint had been previously recorded to the test case database. If not, then the transaction record may be added to the database along with the fingerprint. The transaction record may later be replayed to provide a unique test case. In various embodiments, additional information, such as the information used to determine the transaction record representation, may be stored and indexed in a database to provide for filtering abilities. For example, filter criteria can be used to select a portion of available test cases. Filtering can be used to validate candidate code changes. For example, if the candidate code change is expected to affect one type of transaction, then the database may be filtered to identify unique test cases that exercise that type of transaction along different dimensions.

Accordingly, generating, managing, and validating test cases may be performed in a more predictable and comprehensive manner. Previous techniques involved random sampling of network traffic that would not necessarily exercise some or even all of the ways in which a candidate code change might affect the processing of transaction. Furthermore, randomly sampled transactions would likely result in transactions that are different, but exercise the same dimensions for testing purposes (e.g., they would have hashed to the same fingerprint).

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 illustrates a computing environment 100 in which a test case fingerprint is generated, in accordance with one or more example embodiments of the present disclosure.

In at least one embodiment, transaction record 102 comprises a set of logging data that is recorded from production network traffic. For example, a daemon may be configured to listen to and record requests and responses that are transmitted and/or received in a server-client environment. The daemon, in various embodiments, is a server-side component that listens to these requests and responses, and generates transaction records that are batched and uploaded (e.g., at regular intervals) to a network-accessible data store. A notification or event may be generated when new data is available in the network-accessible data store, and subscribers to the notification or event may receive a message indicating the availability of new data. A subscriber may, in response to being notified, generate test case fingerprints for the uploaded transaction records.

In at least one embodiment, a system such as a container obtains transaction record 102 for fingerprinting. Transaction record 102 may be obtained from logging data of requests and responses between a server and clients or customers. In various embodiments, transaction record 102 is a type of request that encodes request input and request output information. For example, inputs may include various information that a customer of an online purchasing system provides during a purchase workflow. Information provided as inputs may include, for example, a customer identifier, a product name or product identifier, a product price or cost, a billing address, a shipping address, and so forth. A request output may comprise, for example, a tax amount that is computed based on the input information or a portion thereof.

Transaction record 102 may comprise transaction-related data that is organized into different fields. Fields—such as fields 104A-N depicted in FIG. 1—may correspond to different types of data. In various embodiments, transaction records have a uniform format such that all transaction records include the same fields. In some cases, different transaction records may have different fields—for example, in at least one embodiment, transaction records for business entities and individuals may have different fields. For example, a business entity may be required to fill in an Employer Identification Number that is omitted from individual or personal accounts.

A field may have a corresponding parameter value. For example, a field may refer to a Customer Identifier, whereas a parameter value for the field may be a specific customer that is identified in a transaction record. For example, if a first field 104A refers to a "Customer Identifier" field, then a corresponding parameter value for field may be "JoeCustomer123" that corresponds to a specific customer. As a second example, field 104B may refer to a "Product Category" field and may have a parameter value such as "Clothing." Parameter values may be encoded as stringers, integers, Booleans, and various other data types. Parameter values may be required to be in a fixed form, such as timestamps formatted according to the ISO8601 standard. In some cases, a parameter value may include several pieces of information. For example, a shipping address may encode street, city, state, zip code, and country information as a parameter value.

In various embodiments, a system (e.g., container launched in response to new transaction records being uploaded to a network-accessible data store) processes some or all available transaction records to generate test case fingerprints. A test case fingerprint may be generated as depicted in FIG. 1, according to at least one embodiment.

In at least one embodiment, a system retrieves a transaction record 102 and determines a transaction record representation 106 of the transaction record 102. In various embodiments, a transaction record representation 106 is generated based on a set of fields. The set of fields may refer to some or all fields of a transaction record that provide for testing along a unique dimension. In various embodiments, some fields are irrelevant for testing. Consider a non-limiting illustrative example in which testing is to be performed to validate that the correct tax amount is being computed for various purchases of an online purchasing system. Transaction records may include some information that is irrelevant for testing the tax amount—for example, if a first transaction record is a purchase by a first customer, "JoeCustomer123" and a second transaction record is an otherwise identical purchase by a second customer "JillBuyer234" creating separate tests for these two transactions may be considered redundant because the dimension that is being varied (e.g., the customer identifier) is not relevant to the calculation of the tax amount. Accordingly, if field 104A corresponds to a customer identifier field, it may be discarded or otherwise remain unused for the determination of transaction record representation 106.

Continuing with the example above, there are certain other fields besides customer identifiers that may be relevant for testing. For example, field 104B may correspond to a product category, such as Clothing, Electronics, Groceries, and so forth. Field 104B, unlike field 104A, may be relevant to test case generation. For example, when generating test cases to validate that the correct tax amount is calculated, the product category may be relevant to the determination of the tax amount because certain product categories may be taxed differently from other product categories. For example, groceries may be taxable in some jurisdictions (e.g., Tennessee), not taxed in other jurisdictions (e.g., New Jersey), or even taxed at a different rate than items in yet other jurisdictions (e.g., Illinois).

In various embodiments, a set of fields are selected for fingerprinting. In some embodiments, a database is queried to retrieve the set of fields that are relevant for testing to be fingerprinted. The set of fields relevant for testing may be added to the database through selection process by subject matter experts (SME). In some embodiments, the cardinality of fields is used to determine the set of fields. For example, fields with low cardinality may be included in the set of fields whereas fields with higher cardinality may be discarded.

A transaction record representation 106 may comprise or otherwise encode parameter values of the set of fields that are determined as being relevant to test case generation. For example, as depicted in FIG. 1, Field 104A and Field 104D are not in the set of fields, meaning that they are not included, encoded, or otherwise used to compute transaction record representation 106. Conversely, Field 104B, field 104C, and field 104N depicted in FIG. 1 are included in the set of fields. Parameter values of the fields 104B, 104C, 104N or quantities derived thereof may be included, encoded, or otherwise used in the generation of transaction record representation 106.

Hash function 108 may refer to a function that receives an input and generates an output in a one-way or effectively one-way manner. For example, an MD5 hashing algorithm may be used to generate an output. As a second example, a SHA-1 hash may be used as the hash function 108. In various embodiments, the transaction record representation 106 is provided as an input to hash function 108 and the hash function produces, as an output, test case fingerprint 110.

Test case fingerprint 110 may be an output generated by hash function 108 or a quantity derived thereof. In various embodiments, test case fingerprint represents a unique test case that is, in at least some embodiments, used to build a regression suite. Different fingerprints correspond to different dimensions along which transaction records may be tested. For example, a suite of different test cases may be built using real-world production travel that provides testing along different dimensions. For example, a first fingerprint may be generated from a first transaction record in which Grocery items are purchased and taxed at a first rate, and a second fingerprint may be generated from a second transaction record in which Electronics items are purchased at a second tax rate different from the first tax rate. The transaction record representations of the first and second transaction records may be different, resulting in different fingerprint values for the two transaction records.

In various embodiments, unique fingerprints are used to build a database of test cases. For example, a database of test cases may be built in the following manner: when a test case fingerprint 110 is generated, a database 112 of test cases is queried to determine whether another transaction record with the same fingerprint was previously recorded. In various embodiments, if test case fingerprint 110 is found in the database 112, it means that there already exists a test case that tests along the same dimensions as transaction record 102, and the transaction record is not added to database 112. In some embodiments, a counter is incremented 114 to reflect the cardinality or frequency in which a fingerprint is encountered. However, if the test case fingerprint 110 was not found in the database 112, then it may be added to the test case database as a new test case.

While FIG. 1 depicts an embodiment in which database 112 stores one test case sample per fingerprint, in other embodiments, multiple test cases are collected per sample. For example, in some embodiments, test case fingerprint 110 is determined and then database 112 is queried to determine a count of how many test case samples have been collected for the fingerprint. If the number of collected samples is less than a threshold number, then transaction record 102 may be added to database 112 and additional test cases with the same fingerprint may be added to the database until the threshold number is reached. The threshold may be determined in any suitable manner, for example, it may be a fixed number, may be configurable by an administrator or system user, may be selected based on the storage space available for the database 112 and the expected number of unique fingerprints, and so forth. In some embodiments, multiple test cases are stored for fingerprints that occur more frequently—for example, additional samples may be collected for a fingerprint when the counter reaches n=1,000, n=2,000, and so forth. Having multiple test case samples for a fingerprint may allow for more robust testing of a particular fingerprint, may be used to validate and/or determine that a particular field is not relevant to fingerprinting, and so forth.

Figure 2:
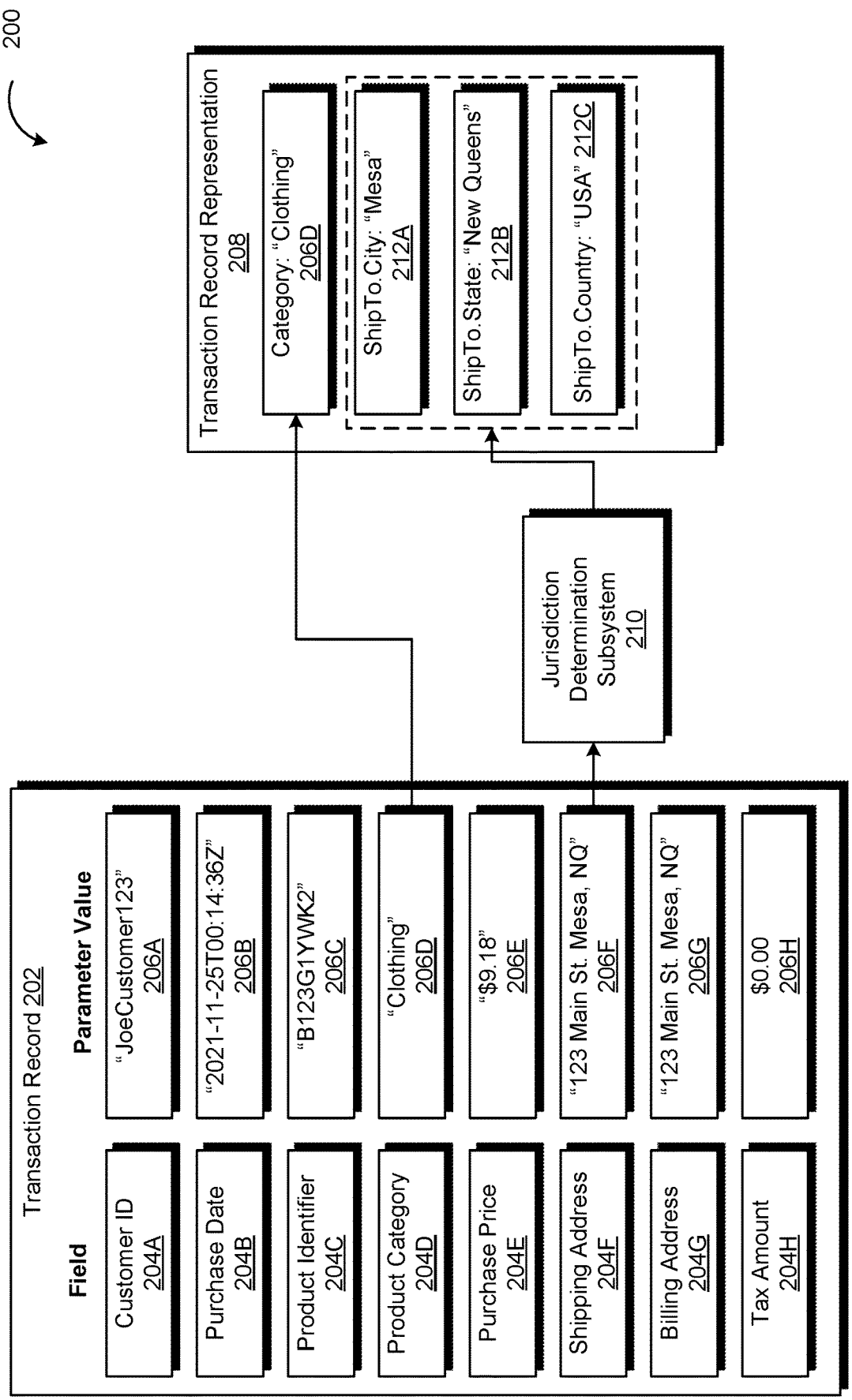
FIG. 2 illustrates a diagram of a detailed view of a transaction record and transaction record representation, in accordance with one or more example embodiments of the present disclosure.

FIG. 2 illustrates a diagram 200 of a detailed view of a transaction record and transaction record representation, in accordance with one or more example embodiments of the present disclosure.

In at least one embodiment, transaction record 202 refers to logging data of a transaction request and/or response that was processed by a server. In various embodiments, the transaction record 202 reflects a transaction that was recorded in a production environment, which may be used to serve real-world customers of the server. Transaction record may include, for example, transaction input data and transaction output data. Transaction input data may be information included in a transaction request and transaction output data may be information that is included in a transaction response to the transaction request. For example, transaction input data may be information of items in a checkout cart and transaction output data may include a tax amount to charge for the items. Transaction record 202 may include sufficient information to re-create or replay the underlying transaction request.

Transaction record 202 may comprise various fields, such as fields 204A-H depicted in FIG. 2. The fields shown in FIG. 2 are merely illustrative in nature, and greater or fewer numbers of fields or different combinations of fields may be present. For example, field 204A corresponds to a customer identifier field, field 204B corresponds to a purchase date, field 204C corresponds to a product identifier field, field 204D corresponds to a product category field, field 204E corresponds to a purchase price field, field 204F corresponds to a shipping address field 204F, field 204G corresponds to a billing address field, and field 204H corresponds to a tax amount field. Fields 204A, 204B, 204C, 204D, 204E, 204F, and 204G may be indicated as being input fields to a transaction request, and field 204H may be indicated as being an output field of a transaction response to the transaction request.

Transaction record 202 may comprise various parameter values, such as parameter values 206A-H depicted in FIG. 2. The parameter values 206A-H may map to respective fields 204A-H. The parameter values shown in FIG. 2 are merely illustrative in nature, and greater or fewer numbers of parameter values or different combinations of parameter values may be present. For example, parameter value 206A corresponds to a customer identifier value "JoeCustomer123", parameter value 206B corresponds to a purchase date value of "2021-11-25T00:14:36Z" (e.g., ISO8601 time format), parameter value 206C corresponds to a product identifier value of "B123G1YWK2", parameter value 206D may correspond to a product category value of "Clothing", parameter value 206E may correspond to a purchase price of $9.18, parameter value 206F may correspond to a shipping address string of "123 Main St. Mesa, NQ" (note that NQ refers to a fictitious state of "New Queens" that is used for illustrative purposes only), parameter value 206G may correspond to a billing address string of "123 Main St. Mesa, NQ", and parameter value 206H may correspond to a tax amount of $0.00. Parameter values 206A, 206B, 206C, 206D, 264E, 206F, and 206G may be indicated as being input parameter values to a transaction request, and parameter value 206H may be indicated as being an output parameter value of a transaction response to the transaction request.

Transaction record representation 208 may be generated based on transaction record 202. In various embodiments, a set of fields that are relevant for fingerprinting are determined. The set of fields may be obtained from a database or any other suitable source to provide an indication of unique dimensions along which to generate test cases. FIG. 2 illustrates an example in which the set of fields includes field 204D because the product category has been identified as being relevant to fingerprinting. Accordingly, the corresponding parameter value 206D is included in transaction record representation 208.

In various embodiments, one or more fields of transaction record 202 may be indicated as being relevant to fingerprinting in an indirect manner. In contrast to field 204D, which may be directly encoded in transaction record representation 208, field 204F corresponding to the billing address field may be relevant for fingerprinting in an indirect manner. Consider that there are possibly millions of valid shipping addresses in a country or state. Due to the large number of possible values, this may be considered a high cardinality field. However, the cardinality or of the shipping address may be reduced by jurisdiction determination subsystem 210.

As part of a fingerprinting routine, intermediate transaction data may be generated based on transaction input data. Intermediate data may be data that is derived at least in part from input data to a transaction. For example, jurisdiction determination subsystem 210 may determine that the shipping address value "123 Main St. Mesa, NQ" can be reduced to intermediate city, state, and country values "Mesa," "New Queens," and "USA" respectively that can be used to reduce the amount of unique fingerprints generated by transactions that are being shipped to Mesa, New Queens, as the specific street information within Mesa, New Queens may not be relevant to testing purposes. In various embodiments, jurisdiction determination subsystem 210 is used to extract information relevant to fingerprinting and reduces the cardinality of the transaction input data to a more manageable size. For example, for shipping addresses, the relevant fingerprinting information may include the city and state, but not street-level information. The city-level information may be needed to properly apply municipal or local taxes. Jurisdiction determination subsystem 210 is merely one example of a subsystem that may be used to generate intermediate transaction data that is used as part of transaction record representation 208, and various other intermediate values may be generated and encoded in transaction record representation 208 to reduce dimensionality of the test cases.

In some embodiments, calculated values are used to categorize buckets of items into logically similar groupings for the purposes of testing and validation. For example, for the purposes of tax calculations, there may only be a few specific categories that are taxed at a special rate. For example, some states tax groceries and/or clothing at lower rates, or not at all. All other product categories may be mapped to an intermediate category "Other Taxable Items" that serves as a catchall for electronics, furniture, or other categories that may be identical from the perspective of validating tax amounts.

In some embodiments, additional information is encoded to intermediate transaction data 212A-C that is not in the input parameter value. For example, the country information may be implicit in transaction record 202 but may be encoded explicitly in the intermediate transaction data 212A-C. For example, this may be to uniquely identify a jurisdiction. As depicted in FIG. 2, information in a transaction record field may be parsed and extracted to determine intermediate transaction data 212A, intermediate transaction data 212B, and intermediate transaction data 212C. For example, shipping address information included in parameter value 206F may be parsed by a jurisdiction determination subsystem 210 that extracts city, state, and country level information of the shipping address, which is stored in transaction data 212A, intermediate transaction data 212B, and intermediate transaction data 212C, respectively. Intermediate transaction data sometimes encodes information that is not explicitly included in the input data it is derived from. For example, New Queens may have certain incentive programs such as urban enterprise zone (UEZ) program in which certain reduced taxes are applicable. Typically, a UEZ is a government program enacted to foster new economic development in designated urban communities by encouraging businesses to develop and create private sector jobs through public and private investment. Based on these incentive programs, additional information may be encoded in intermediate transaction data to distinguish whether an incentive program applies to the transaction record. For example, if an incentive program such as UEZ applies, then additional intermediate data may be used to indicate that the incentive program applies, and this additional information may be further included in transaction record representation 208.

Figure 3:
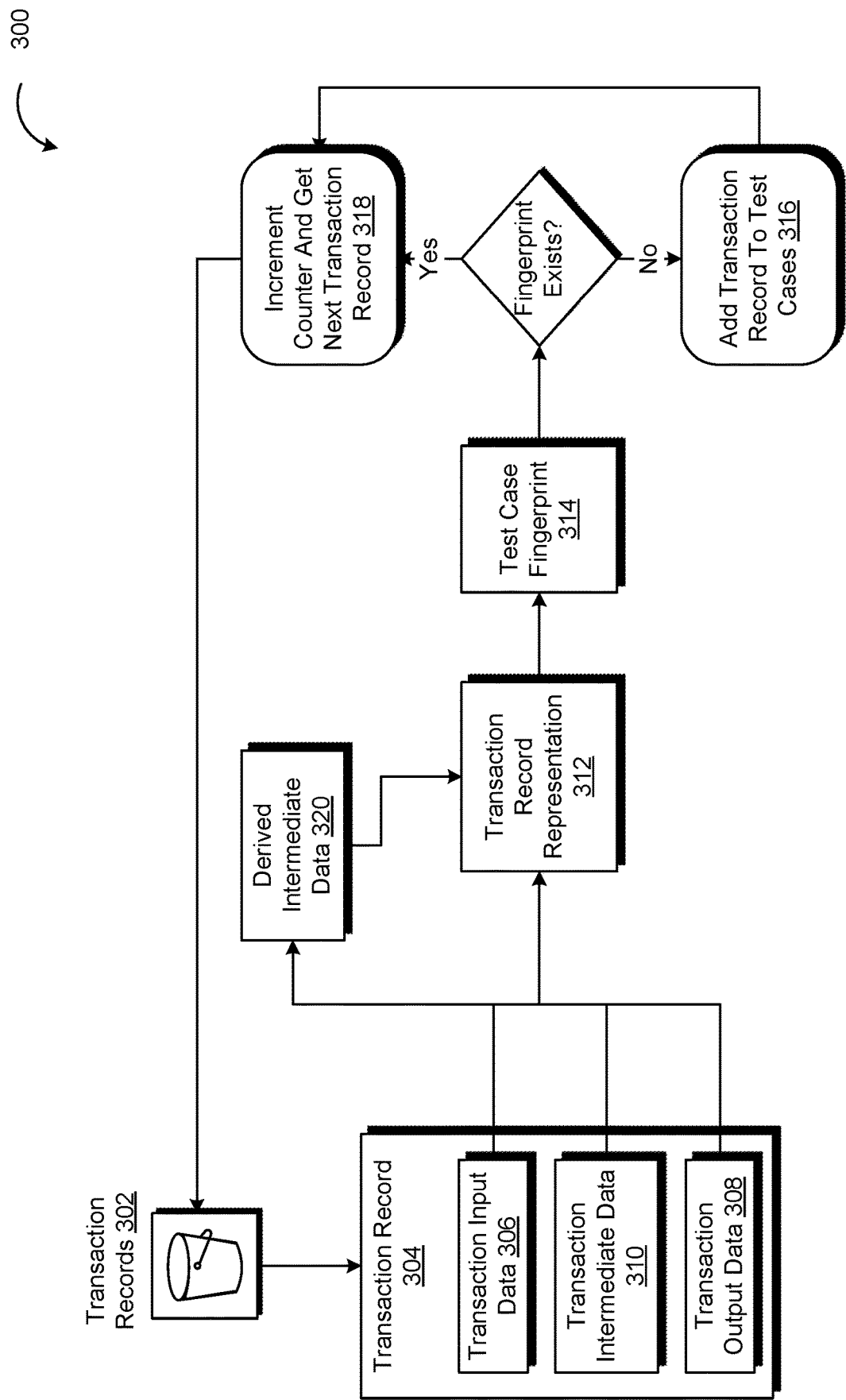
FIG. 3 illustrates a computing environment in which transaction records are processed, in accordance with one or more example embodiments of the present disclosure.

FIG. 3 illustrates a computing environment 300 in which transaction records are processed, in accordance with one or more example embodiments of the present disclosure.

Transaction records 302 may include logged records of various transactions that were processed in a production environment serving real-world customers. In at least one embodiment, transaction records 302 comprise a set of logging data that is recorded from production network traffic. For example, a daemon may be configured to listen to and record requests and responses that are transmitted and/or received in a server-client environment. The daemon, in various embodiments, is a server-side component that listens to these requests and responses, and generates transaction records that are batched and uploaded (e.g., at regular intervals) to a network-accessible data store. A notification or event may be generated when new data is available in the network-accessible data store, and subscribers to the notification or event may receive a message indicating the availability of new data. A subscriber may, in response to being notified, generate test case fingerprints for the uploaded transaction records. While transaction records 302 are depicted in FIG. 3, techniques described herein may be applicable to records of various types of requests, commands, messages, and so forth. In various embodiments, a daemon or other suitable server-side logging system records an API request, including one or more fields and/or parameter values included therein, one or more intermediate fields and/or values that are computed as part of the process of the API request, and an API response that includes one or more fields and/or parameter values. Intermediate fields may be determined based on the fields and/or parameters included in the API request, and these intermediate values may be logged to provide for step-by-step logging of how the response output values are determined.

In various embodiments, a container is launched in response to receiving a notification that transaction records are available for processing—for example, in response to a daemon writing a batch of transaction records to a network-accessible data store. Note that processing of transaction records using a container is merely one among several non-limiting, illustrative embodiments in which test case fingerprints can be generated. Various aspects of the computing environment 300 depicted in FIG. 3 may be implemented in the context of a container that is launched to perform batch processing of transaction records for fingerprinting.

In at least one embodiment, a system (e.g., container) obtains transaction record 304 from a network-accessible data store that stores transaction records 302. Transaction records may be organized strictly or loosely by transaction time. Transaction record 302 may comprise transaction input data 306 and/or transaction output data 308 and/or transaction intermediate data 310. Transaction input data 306 may refer to fields and/or parameter values that are provided as part of a transaction request submitted by a customer, according to at least one embodiment. Transaction input data may be extracted from a web service API request that is submitted by a client to a service. Transaction output data may refer to fields and/or parameter values that are provided as part of a transaction response submitted to the customer in response to the transaction request, according to at least one embodiment. In some embodiments, transaction input data 306 is recorded without transaction output data 308 and may be useful for identifying unique test cases. In various embodiments, techniques described in connection with FIG. 2 are applied in the context of FIG. 3.

Transaction intermediate data 310 may refer to data that is calculated, derived, or otherwise determined based on transaction input data 306. Transaction intermediate data 310 may refer to data that is generated, calculated, derived, or otherwise determined by a system as part of fulfilling or processing a request. For example, jurisdiction information may be determined from the transaction record representation. Transaction intermediate data 310 may be determined according to techniques described in connection with FIG. 2.

Calculated intermediate data 320 may refer to data that is calculated from transaction record 304. In various embodiments, transaction input data 306, transaction output data 308, and transaction intermediate data 310 are recorded as part of execution or fulfillment of a transaction request, calculated intermediate data 320 may be fields and/or data values that are determined separately.

Transaction record representation 312 may comprise any suitable combination of transaction input data 306, transaction output data 308, transaction intermediate data 310, calculated intermediate data 320, including combinations in which one or more of these categories is omitted entirely from transaction record representation 312. In some embodiments, transaction record representation 312 comprises parameter values for a set of fields that are determined to be relevant for fingerprinting. The set of fields may be specified in a database, and queried by a system (e.g., container) that performs the fingerprinting process. In various embodiments, field and/or parameter values are concatenated together to form transaction record representation 312.

Test case fingerprint 314 may be generated based on transaction record representation 312 in any suitable manner. For example, test case fingerprint 314 may be an output of a hash function, such as a MD5, SHA-1, RIPEMD-160, and various others. For example, transaction record representation 312 may be provided as an input to a hash function (e.g., MD5) to produce test case fingerprint 314 as the hash output or a quantity derived thereof.

Once test case fingerprint 314 has been generated, a database of existing test cases may be queried. The database may be in accordance with those discussed in connection with FIG. 4 and/or FIG. 5. In various embodiments, the fingerprint is an indexed column of a database that can be quickly queried to determine whether the database already includes a record with the same fingerprint. A database query may be generated to query or attempt to retrieve a record with the value of the test case fingerprint 314. The system may query a database to determine whether the test case fingerprint 314 was previously generated by another transaction record. A query response may indicate whether the test case fingerprint 314 exists in the database already. For example, the query response may indicate that no records were found with test case fingerprint 314, or a record with the same fingerprint may be returned. If no records were found, then test case fingerprint 314 may be added to the database. In some embodiments, test case fingerprint 314 and transaction record 304 are added to a first database and test case fingerprint 314 and transaction record representation 312 are added to a second database, as a result of determining that transaction record 304 is the first instance of a transaction record with test case fingerprint 314. In this way, the transaction record is added 316 to a suite of test cases. However, this step may be omitted or skipped if there was a previous transaction with the same fingerprint. In either case, the processing of transaction records 302 may continue by incrementing a counter and getting the next transaction record 318 from transaction records 302 and repeating the fingerprinting process for each transaction record in the store of transaction records 302. Incrementing the counter may include incrementing the cardinality of a newly added test case from zero to one.

Figure 4:
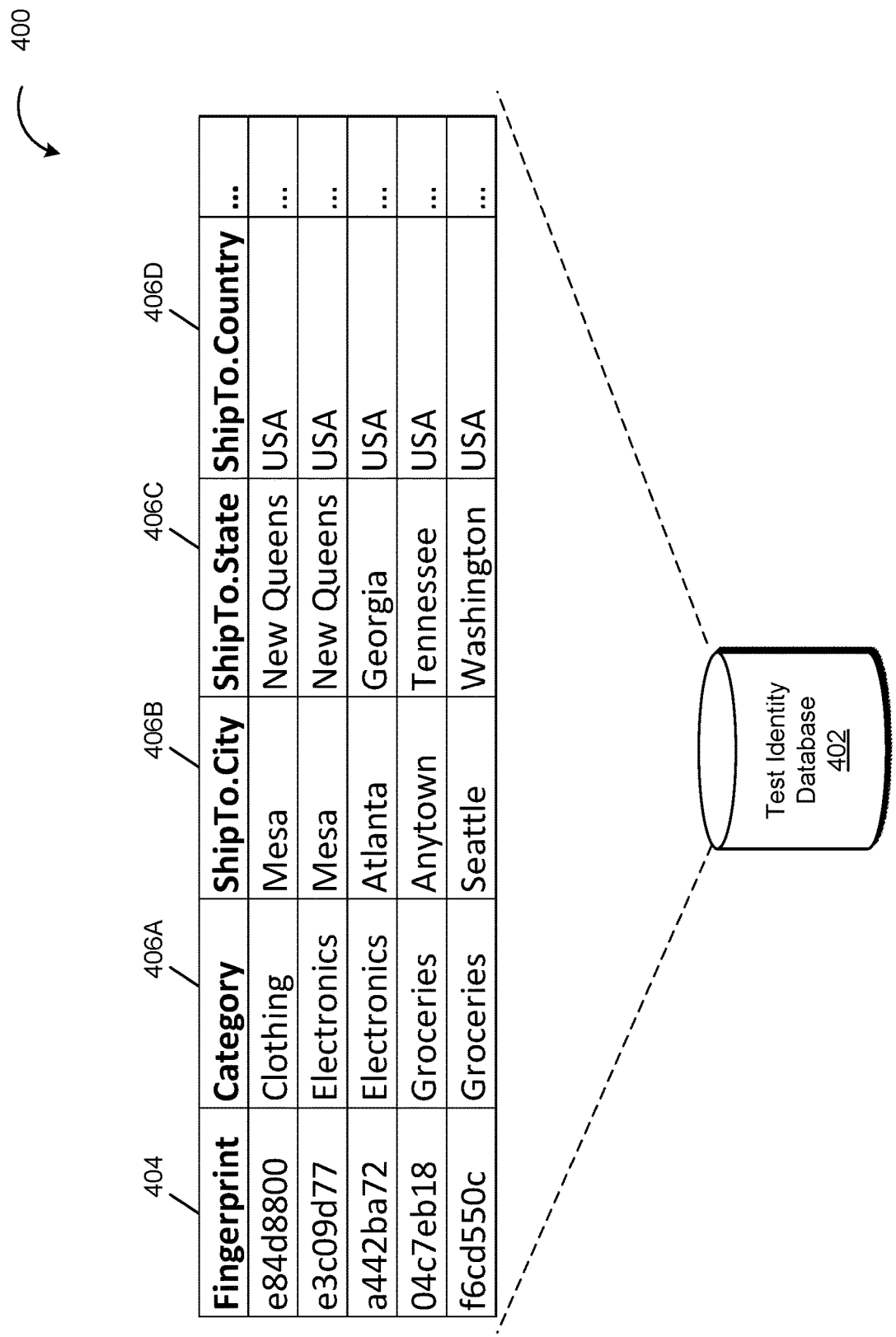
FIG. 4 illustrates a computing environment in which a test identity database is implemented, in accordance with one or more example embodiments of the present disclosure.

FIG. 4 illustrates a computing environment 400 in which a test identity database is implemented, in accordance with one or more example embodiments of the present disclosure. Test identity database 402 may refer to a structured data storage system or other suitable data store. Test identity database 402 may configured with one or more indexed columns. Indexed columns may be used to perform search and/or filter of queries in a performant manner—for example, in log time. For example, fingerprint column 404 may be an indexed column and test identity database 402 may allow for fast querying of the fingerprint column 404 to identify whether a query including a particular fingerprint value exists in the database and/or to retrieve a specific record with the particular fingerprint value.

As depicted in FIG. 4, test identity database 402 may comprise a fingerprint column 404. The fingerprint column may be a keyed column of the database wherein the fingerprint values of different records are guaranteed to be unique. For example, each of the five columns depicted in FIG. 4 have different fingerprint values. Each record (e.g., row) of the database may correspond to at least one test case. In some cases, such as when multiple transaction records hash to the same fingerprint, a record corresponds to several transaction records that are considered equivalent for testing purposes. For example, a first transaction record and second transaction record that are otherwise identical except for the purchasing customer may be equivalent for purposes of testing that the correct tax amount is computed. In some embodiments, test identity database 402 includes a column for the cardinality of the fingerprint, or a count of the number of times that fingerprint has been encountered.

Test identity database 402 may further comprise a plurality of columns such as columns 406A, 406B, 406C, and 406D. These additional columns may correspond to the fields that are encoded in the transaction record representation that is used to generate the fingerprint. Test identity database 402 may be used for various querying, filtering, and searching capabilities.

In various embodiments, records of the test identity database 402 represent different unique test cases. For example, the first record depicted in FIG. 4 may correspond to a transaction record that can be used to test whether a transaction for a purchase of a clothing-related item with shipping address of Mesa, New Queens, USA. The tax amount may vary based on the product category and/or the jurisdiction. As a second example, the second record may indicate that a second test case is available to validate whether a transaction for a purchase of electronics-related item with shipping address of Mesa, New Queens, USA is correct.

In various embodiments, test identity database 402 can be utilized to perform targeted or filtered testing. For example, test identity database 402 may be used to identify a subset of the database that should be tested, based on the query parameters. For example, if New Queen reduces its tax rate from 8% to 7%, updates to an online purchasing platform may be applied in a test environment and validated in the test environment prior to being rolled out to a production environment that will impact real-world customers. In at least one embodiment, as part of validation, test identity database 402 may be queried to find all records that relate to the New Queens jurisdiction. This may be achieved by filtering on jurisdiction information included in columns 406B, 406C, and 406D for any records that include "New Queens" as the state-level information and "USA" in country-level column. The query result may be returned as a list of fingerprint values, which can be used to query a test transactions database to find transaction records that may be replayed to perform regression testing, for example, using techniques described in connection with FIG. 5.

Figure 5:
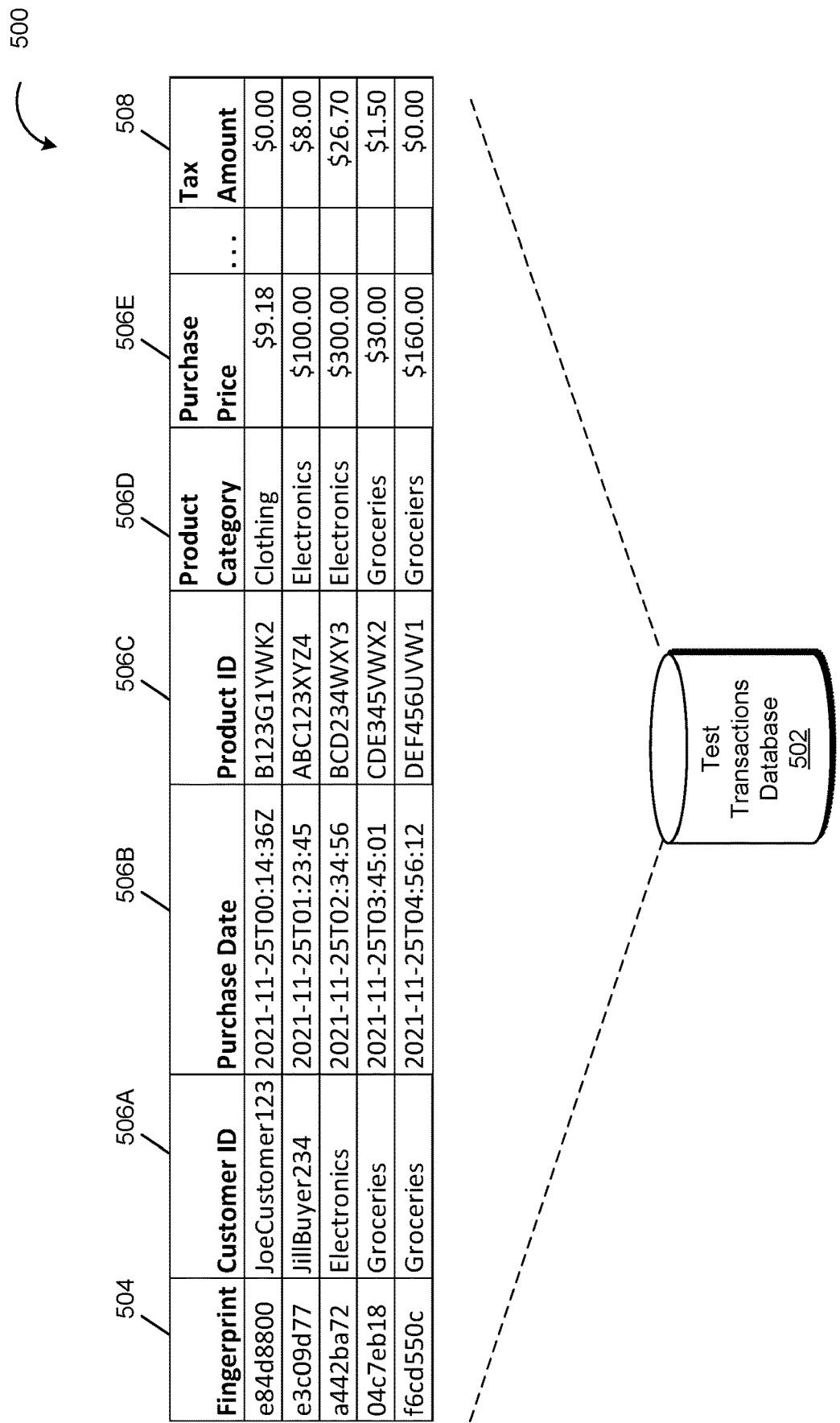
FIG. 5 illustrates a computing environment in which a test identity database is implemented, in accordance with one or more example embodiments of the present disclosure.

FIG. 5 illustrates a computing environment 500 in which a test identity database is implemented, in accordance with one or more example embodiments of the present disclosure. Test transactions database 502 may refer to a structured data storage system or other suitable data store. Test transactions database 502 may configured with one or more indexed columns. Indexed columns may be used to perform search and/or filter of queries in a performant manner—for example, in log time. For example, fingerprint column 504 may be an indexed column and test transactions database 502 may allow for fast querying of the fingerprint column 504 to identify whether a query including a particular fingerprint value exists in the database and/or to retrieve a specific record with the particular fingerprint value.

As depicted in FIG. 5, test identity transactions 502 may comprise a fingerprint column 504. The fingerprint column may be a keyed column of the database wherein the fingerprint values of different records are guaranteed to be unique. For example, each of the five columns depicted in FIG. 5 have different fingerprint values. Each record (e.g., row) of the database may correspond to at least one test case. In some cases, such as when multiple transaction records hash to the same fingerprint, a record corresponds to several transaction records that are considered equivalent for testing purposes. For example, a first transaction record and second transaction record that are otherwise identical except for the purchasing customer may be equivalent for purposes of testing that the correct tax amount is computed.

Test transactions database 502 may further comprise a plurality of columns such as columns 506A, 506B, 506C, 506D, 506E, and 508. These additional columns may correspond to the fields that are encoded in the transaction record representation that is used to generate the fingerprint. Test transactions database 502 may be used for various querying, filtering, and searching capabilities. Example embodiments of test transactions database 502 may be described in conjunction with the test identity database depicted in FIG. 4. In some embodiments, tax transactions database 502 comprises a column for each transaction input and output field.

In various embodiments, test transactions database 502 is used to retrieve and replay previous transaction requests as part of validation or regression testing. For example, if the first row of test transaction database 502 depicted in FIG. 5 is selected, the record may be used to replay a previous transaction in which a customer "JoeCustomer123" purchased a clothing items for $9.18 and was charged $0.00 in taxes. This example may reflect a test case in which clothing-item was purchased in a jurisdiction in which clothing-related items are not taxed, hence the tax amount of $0.00 in column 508. As noted in FIG. 4, the example may relate to a clothing-item purchase that is being shipped to Mesa, New Queens, USA.

As a second example, the second record of test transactions database 502 may relate to an electronics-related item that is being shipped to Mesa, New Queens, USA. This item may be taxed at 8%, for example, due to the fact that New Queens charges 8% sales tax for most items but exempts clothing from sales tax. Accordingly, the tax amount in the second column is 8% of $100.00, or $8.00 as shown in the second row at column 508.

Likewise, additional records of test transactions database 502 may represent different unique test cases. For example, the third row of test transactions database 502 depicted in FIG. 3 may be used to validate that the tax amount for electronics-related purchases made in Atlanta, GA, is 8.9%.

In various embodiments, regression testing is improved by allowing users to query along only the dimensions and fields of interest. For example, using conventional sampling techniques that randomly sample a portion (e.g., 1% of network traffic) for replay testing, there is a probability that none of the sampled network traffic actually exercises or validates the dimensions that are affected by a code change. Additionally, creating test cases by hand is an error-prone process, and may result in the creation of faux-transaction records that are not actually possible to generate in a real-world environment.

Figure 6:
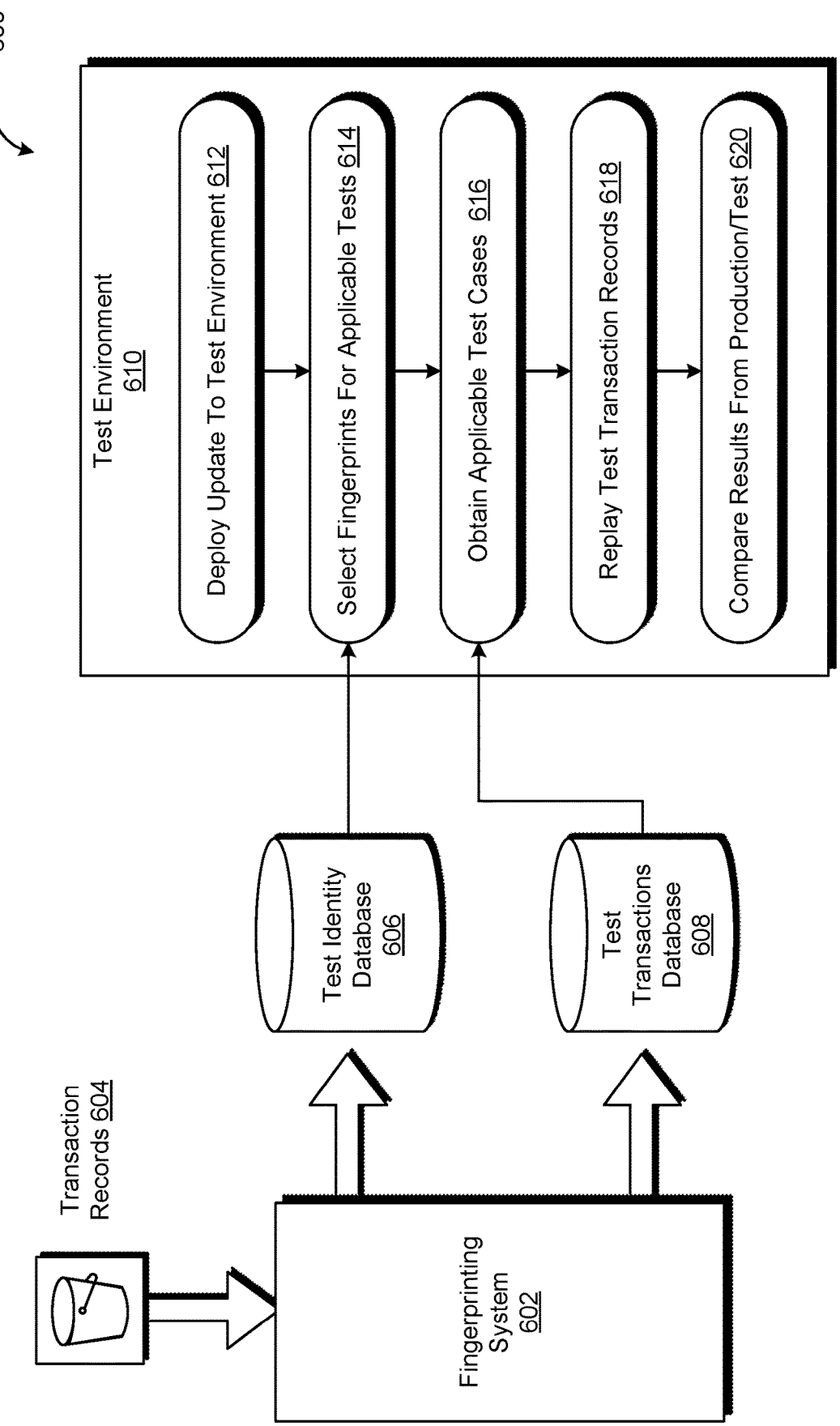
FIG. 6 illustrates a computing environment in which regression testing is performed, in accordance with one or more example embodiments of the present disclosure.

FIG. 6 illustrates a computing environment 600 in which regression testing is performed, in accordance with one or more example embodiments of the present disclosure.

In at least one embodiment, fingerprinting system 602 refers to a container or other suitable compute resource that has loaded, on one or more memories, executable instructions that, as a result of execution, causes the system to generate test case fingerprints from transaction records. In at least one embodiment, fingerprinting system 602 obtains transaction records 604 generated in a production environment. Transaction records may reflect transaction requests/responses that were utilized in transactions processed in a production environment. For example, fingerprinting system 602 may be implemented in accordance with systems discussed in connection with FIGS. 1-5, 7, and 8.

Transaction records 604 may include logged records of various transactions that were processed in a production environment serving real-world customers. In at least one embodiment, transaction records 604 comprise a set of logging data that is recorded from production network traffic. For example, a daemon may be configured to listen to and record requests and responses that are transmitted and/or received in a server-client environment. The daemon, in various embodiments, is a server-side component that listens to these requests and responses, and generates transaction records that are batched and uploaded (e.g., at regular intervals) to a network-accessible data store. A notification or event may be generated when new data is available in the network-accessible data store, and subscribers to the notification or event may receive a message indicating the availability of new data. A subscriber may, in response to being notified, provision and launch a container for fingerprinting system to process the transaction records 604 and generate test case fingerprints.

Fingerprinting system may generate test case fingerprints and provide test case information to test identity database 606 and test transactions database 608. In various embodiments, a transaction record is parsed and input data, intermediate data, and/or output data of a transaction record is combined to generate a transaction record representation. A hash of the transaction record representation may be a test case fingerprint.

In various embodiments, fingerprinting system obtains a transaction record, determines a transaction record representation from the transaction record, and produces a test case fingerprint from the transaction record representation. In various embodiments, unique tuples of fields used to generate fingerprints are stored in test identity database 606 along with fingerprints. In various embodiments, each unique fingerprint has a corresponding transaction record that is stored in test transactions database 608. Test identity database 606 and test transactions database 608 may be implemented in accordance with techniques discussed in connection with FIG. 4 and/or FIG. 5. In some embodiments, a third database is used to store cardinality information indicating how frequently different fingerprints are encountered in production In various embodiments, test environment 610 performs regression testing using test identity database 606 and test transactions database 608.

In at least one embodiment, test environment 610 refers to a sandboxed computing environment that is separate from a production environment. For example, code changes may be deployed to a cabined test environment and validated before they are deployed to customers. Test environment 610 may be used to perform regression testing of code changes. For example, within test environment 610, a developer or other user may deploy 612 as an update to the test environment 610. The update may, for example, be a candidate code change, a configuration change, data change, and so forth. For example, the tax rate of New Queens may be updated from 8% to 7% in anticipation of a reduced tax rate being applied in the near future.

In various embodiments, a tester may select 614 fingerprints for applicable tests. The applicable tests may be selected, for example, based on the nature of the change that is being deployed or the amount of verification that is needed. For example, if the tax rate of New Queens is being updated from 8% to 7%, then all unique tuples of test cases in test identity database 606 that have New Queens in its jurisdiction may be retrieved from test identity database 606 via a query request. In some embodiments, selection of applicable tests involves additional random or weighted sampling. For example, a tester may retrieve additional test cases, in addition to retrieving all unique tuples relating to New Queens from test identity database 606. The additional test cases may be selected to ensure that the change has no effect on transactions processed in other jurisdictions. In various embodiments, cardinality information is used to perform a weighted random selection. For example, if a first test case occurs twice as often in production as compared with a second test case, the first test case may be weighted so that it is selected twice as often as the second test case. In some embodiments, the selection of fingerprints may simply involve selecting all fingerprints to replay all unique test cases as part of regression testing.

In at least one embodiment, a list of fingerprints corresponding to applicable tests. The list of fingerprints may be used to obtain 616 applicable test cases from test transactions database 608. For example, the fingerprints may be provided to test transactions database 608 to obtain corresponding transaction records. These transaction records may be used to replay 618 test transactions in the test environment 610 and exercise the updates in a cabined environment that limits the blast radius of any bugs or unexpected changes in behavior. Replaying a test may comprise obtaining a transaction record, creating a transaction request based on the transaction record (e.g., using the transaction input data of the transaction record), and then submitting the generated transaction request to a server within the test environment 610 that includes the deployed update. A response to the transaction request may be recorded. The results from the test environment response and production environment response (e.g., encoded as transaction output data in the transaction record) may be compared 620 to determine whether the results generated in test environment 610 are expected. For example, if a change is made in a test environment to update the sales tax of New Queens from 8% to 7%, a filter criteria may be applied to identify the fingerprints of only the transaction records that are for New Queens. These records may retrieved from test transactions database by providing a query with the fingerprints of the relevant records, or by applying a filter criteria on the jurisdiction in test transactions database. Accordingly, better targeted testing and validation may be achieved. For example, in the case of updating the sales tax for New Queens, in at least one embodiment, a validation test suite with all of the transaction records of in New Queens may be retrieved and replayed and the new responses may be recorded. In this case, the tax amount in the original response and the response provided by the code being validated may differ by an amount that is expected. For example, since the tax rate is expected to change, the second record may be replayed to simulate the purchase of $100.00 in a test environment and a tax amount that is 1% lower than from the historical transaction record would be expected. Accordingly, the validation test would pass if the tax amount in test is returned as $7.00 and not $8.00, as in the historical transaction record. Likewise, if additional test cases were sampled that had other, unrelated jurisdictions, those transaction records could be replayed to generate test environment results that should match (e.g., are equal to) the transaction output data of the transaction records, as those test cases should not have been affected by the update.

Figure 7:
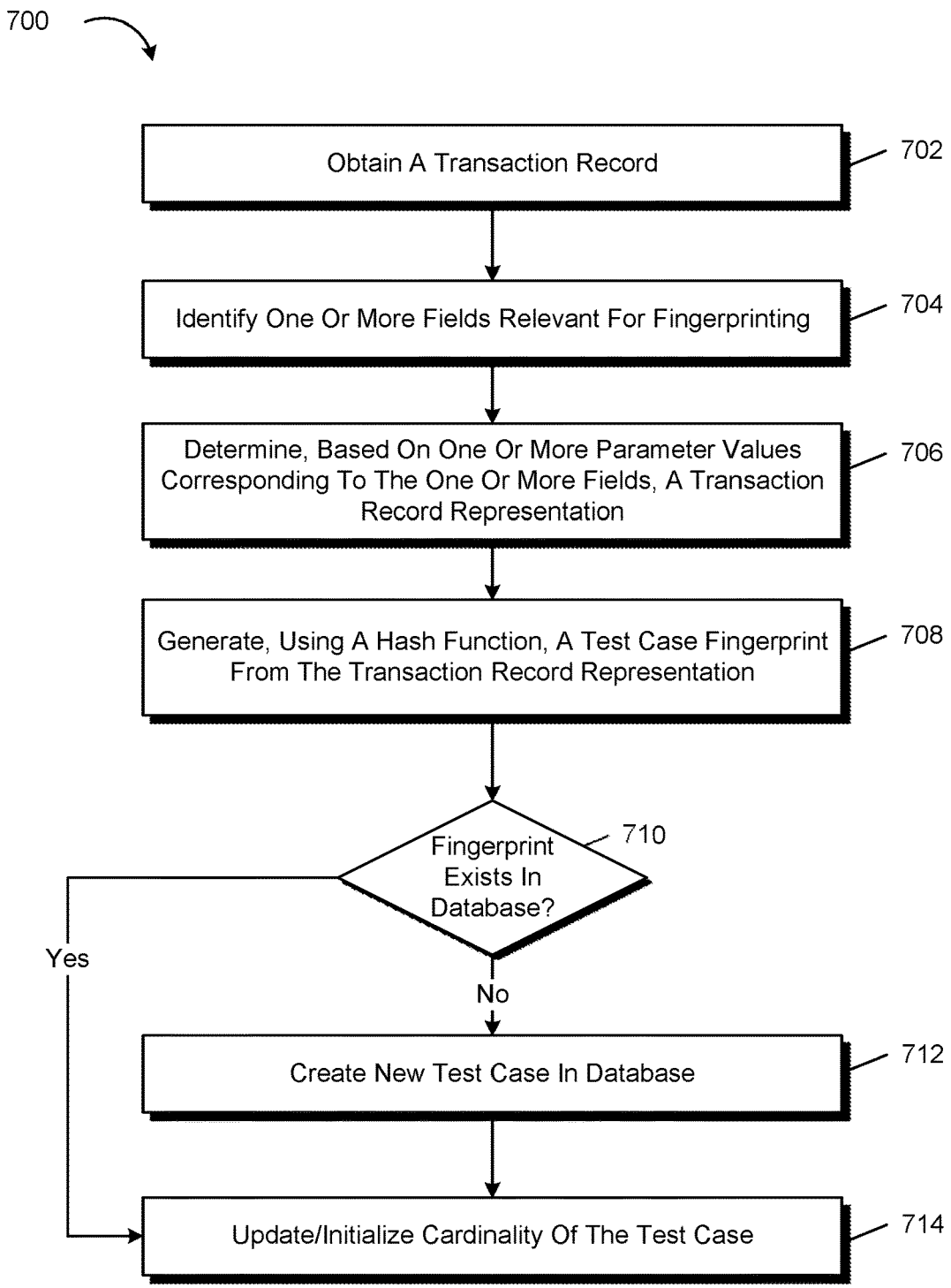
FIG. 7 shows an illustrative example of a process for test case generating using fingerprinting, in accordance with one or more example embodiments of the present disclosure.

FIG. 7 shows an illustrative example of a process 700 for test case generating using fingerprinting, in accordance with one or more example embodiments of the present disclosure. In at least one embodiment, some or all of the process 700 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 700 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 700 may be implemented in the context of various systems and methods described elsewhere in this disclosure, such as those discussed in connection with FIGS. 1-6 and 8. In at least one embodiment, process 700 or a portion thereof is performed on a container or other suitable compute instance hosted by a computing resource service provider.

Transaction records may include logged records of various transactions that were processed in a production environment serving real-world customers. In at least one embodiment, transaction records comprise a set of logging data that is recorded from production network traffic. For example, a daemon may be configured to listen to and record requests and responses that are transmitted and/or received in a server-client environment. The daemon, in various embodiments, is a server-side component that listens to these requests and responses, and generates transaction records that are batched and uploaded (e.g., at regular intervals) to a network-accessible data store. A notification or event may be generated when new data is available in the network-accessible data store, and subscribers to the notification or event may receive a message indicating the availability of new data. A subscriber may, in response to being notified, provision and launch a container to perform process 700.

In at least one embodiment, process 700 comprises a step to obtain 702 a transaction record. The transaction record may be retrieved from a network-accessible data store. A daemon may be batched and uploaded transaction records processed in a production environment at regular intervals, such as every 5, 10, 15, 20, 30, 40, 50, 60 minutes, and so forth. Transaction record may be in accordance with those described in connection with FIGS. 1-6.

In at least one embodiment, process 700 comprises a step to identify 704 one or more fields relevant for fingerprinting. In various embodiments, a set of fields relevant to fingerprinting is obtained from a database. The set of fields may be determined based on cardinality—how many different unique parameter values of a field there are or are expected. In some embodiments, fields are classified as high or low cardinality. A threshold for high or low cardinality may be set based on the expected overall footprint that would be generated based on various cardinality thresholds. For example, fields with under 10,000 distinct values may be considered low cardinality. In various embodiments, fields may be selected by subject matter experts as being relevant to fingerprinting even though they have high cardinality.

In at least one embodiment, process 700 comprises a step to determine 706, based on one or more parameter values corresponding to the one or more fields, a transaction record representation. For example, transaction input data values may be extracted from the transaction record. In various embodiments, the one or more parameter values include intermediate values calculated or otherwise derived from transaction inputs. For example, jurisdiction may be a derived field that is determined based on address information included in the transaction record. For example, techniques described in connection with FIG. 2 may be utilized to determine the transaction record representation.

In at least one embodiment, process 700 comprises a step to generate 708, using a hash function, a test case fingerprint from the transaction record representation. Test case fingerprint may be generated based on transaction record representation in any suitable manner. For example, test case fingerprint may be an output of a hash function, such as a MD5, SHA-1, RIPEMD-160, and various others. For example, transaction record representation may be provided as an input to a hash function (e.g., MD5) to produce test case fingerprint as the hash output or a quantity derived thereof.

In at least one embodiment, process 700 comprises a step to determine whether 710 the fingerprint already exists in a database. The database may refer to a test identity database, test transactions database, or other suitable database that stores fingerprints and manages the universe of test cases. In various embodiments, a test identity database (e.g., as described in connection with FIG. 4) is used to identify whether a previous transaction with the same fingerprint was already added to a test case database.

In at least one embodiment, process 700 comprises a step to generate 712 a new test case in the database if the fingerprint does not already exist in the database. In some embodiments, the transaction record representation is stored in association with the fingerprint in a test identity database. In some embodiments, the transaction record is stored in association with the fingerprint in a test transactions database.

In at least one embodiment, process 700 comprises a step to update/initialize 714 cardinality of the test case. In the case that the fingerprint already exists, a counter or cardinality value of the fingerprint may be incremented to reflect the occurrence of an additional transaction record that exercises the same test case. In cases where a new test case is added to the database, a counter may be initialized to one, indicating the cardinality of the test case is one as it is the first time that this test case has occurred.

In some examples, a container instance (also referred to herein as a "software container instance") may refer to a computer system instance (virtual or non-virtual, such as a physical computer system running an operating system) that is configured to launch and run software containers. Thus, the container instance may be configured to run tasks in containers in accordance with the task definition provided by the customer. One or more container instances may comprise an isolated cluster or group of containers. In some examples, "cluster" may refer to a set of one or more container instances that have been registered to (i.e., as being associated with) the cluster. Thus, a container instance may be one of many different container instances registered to the cluster, and other container instances of the cluster may be configured to run the same or different types of containers. The container instances within the cluster may be of different instance types or of the same instance type. A customer of a computing resource service provider may have more than one cluster. Thus, the customer may launch one or more clusters and then manage user and application isolation of the containers within each cluster through application programming interface calls.

A container (also referred to as a "software container") may be a lightweight virtual machine instance running under a computer system instance that includes programs, data, and system libraries. When the container is run (or executed), the running program (i.e., the process) is isolated from other processes running in the same computer system instance. Thus, containers may each run on an operating system (e.g., using memory, CPU, and storage allocated by the operating system) of the container instance and execute in isolation from each other (e.g., each container may have an isolated view of the file system of the operating system). Each of the containers may have its own namespace, and applications running within the containers are isolated by only having access to resources available within the container namespace. Thus, containers may be an effective way to run one or more single applications within their own namespace. A container encapsulation system allows one or more containers to run within a single operating instance without overhead associated with starting and maintaining virtual machines for running separate user space instances.

The containers may be launched to have only specified resources from resources allocated to the container instance; that is, a container may be launched to have a certain amount of memory and not utilize more than a specified amount of processing power. Multiple containers may run simultaneously on a single host computer or host container instance, and the resources of the host can be allocated efficiently between the containers using this system. In an embodiment, a host supports running containers in container instances from only one customer (referred to herein as a "single-tenant" environment). In other embodiments, a single host may allow multiple customers to have container instances running on the host (referred to herein as a "multi-tenant" environment). In the latter case, the container service may provide security to ensure that the customers are unable to access containers, clusters, or container instances of the others.

Pre-image resistant functions include one-way functions (i.e., functions that may not be computationally difficult to compute for a current value, but may not be computationally trivial to determine a previous value from the current value), having a recurrence relationship to a previous value of the function. The one-way membership function may not be mathematically proven/provable as one-way, but have computational complexity properties that render the function pre-image resistant. One-way functions (also referred to as "effectively one-way functions") include, but are not limited to, cryptographic hash functions such as message authentication codes, (e.g., hash based message authentication code (HMAC)), key derivation functions, such as PBKDF2 and bcrypt (e.g., with the password being based at least in part on the plaintext and the cryptographic key) and other secure randomization functions which may, but do not necessarily, have a domain (set of possible inputs) that is larger than their range (possible outputs). Other suitable functions (referred to as "f") for various embodiments include, but are not limited to, functions that take at least a plaintext and cryptographic key as input and that have a property of pre-image resistance (given a value y, the probability of randomly generating an input x such that f(x)=y is below a specified threshold), second pre-image resistance (given an input $x_1$, the probability of randomly generating another input $x_2$, different from $x_1$, such that $f(x_1)=f(x_2)$ is below a specified threshold) and/or collision resistance (the probability of two different inputs resulting in the same output is less than a specified threshold). One-way functions suitable for use in generating an identifier for data include functions that satisfy properties of collision resistance (i.e., the probability of $f(x_1)=f(x_2)$ for different $x_1$ and $x_2$ is below a threshold). Other hash functions usable in accordance with the techniques of the present disclosure include, but are not limited to, functions described in the National Institute of Standards and Technology (NIST) Special Publication 800-107, Revision 1 "Recommendation for Applications Using Approved Hash Algorithms," which is incorporated herein by reference. Examples of hash functions that are not necessarily cryptographically secure include MD5-based hash functions, which generates a.

One or more operations of the methods, process flows, or use cases of FIGS. 1-8 may have been described above as being performed by a user device, or more specifically, by one or more program module(s), applications, or the like executing on a device. It should be appreciated, however, that any of the operations of the methods, process flows, or use cases of FIGS. 1-8 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-8 may be described in the context of the illustrative devices, it should be appreciated that such operations may be implemented in connection with numerous other device configurations.

The operations described and depicted in the illustrative methods, process flows, and use cases of FIGS. 1-8 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-8 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

The examples presented herein are not meant to be limiting.

Figure 8:
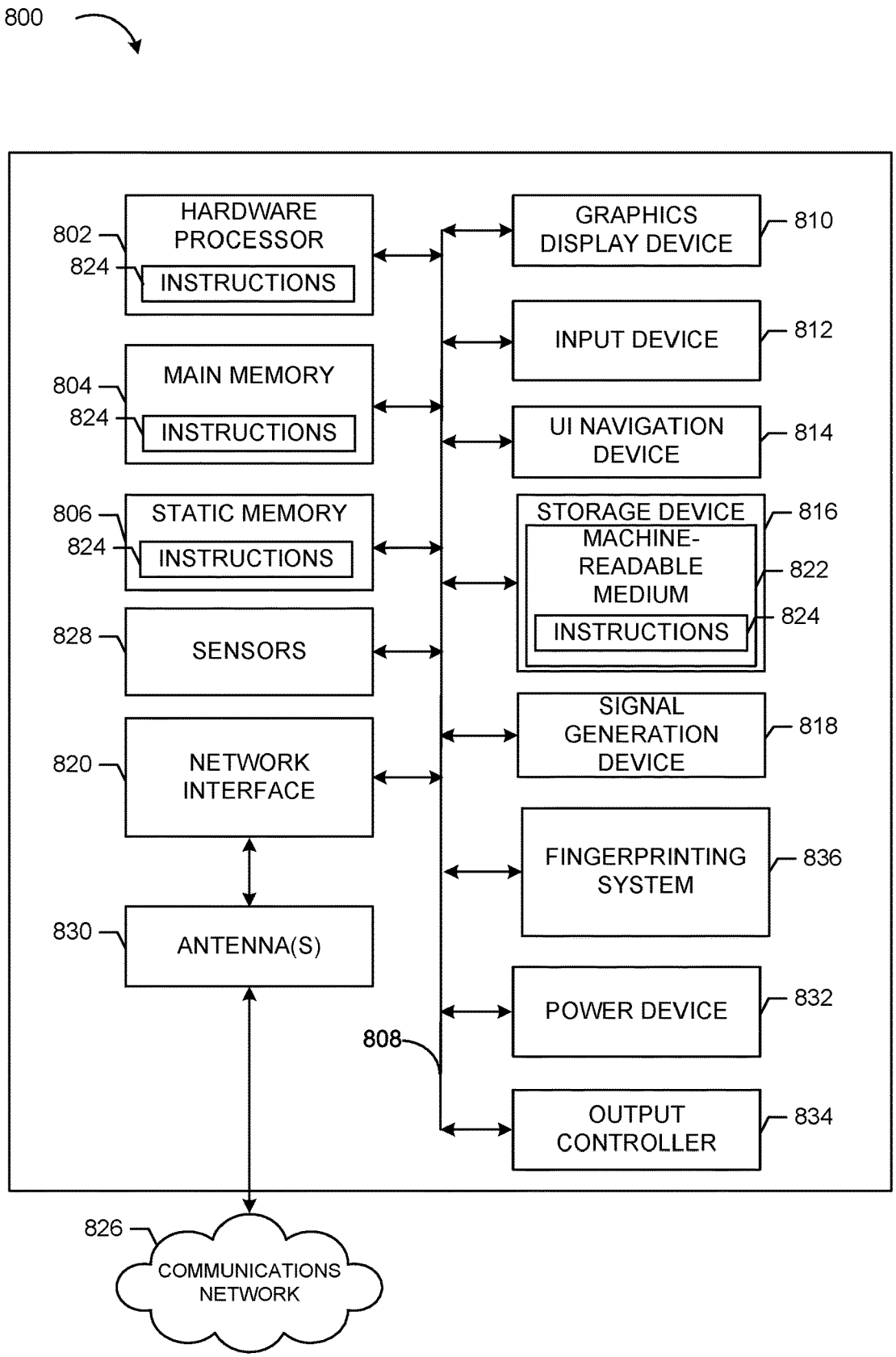
FIG. 8 illustrates a block diagram of an example machine upon which any of one or more techniques (e.g., methods) may be performed, in accordance with one or more example embodiments of the present disclosure.

FIG. 8 illustrates a block diagram of an example of a machine 800 (e.g., implemented in whole or in part in the context of embodiments described in connection with other figures. In some embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in Wi-Fi direct, peer-to-peer (P2P) (or other distributed) network environments. The machine 800 may be a wearable device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 800 may include any combination of the illustrated components. For example, the machine 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include sensors 828, a power management device 832, a graphics display device 810, an alphanumeric input device 812 (e.g., a keyboard), and a user interface (UI) navigation device 814 (e.g., a mouse). In an example, the graphics display device 810, alphanumeric input device 812, and UI navigation device 814 may be a touch screen display. The machine 800 may additionally include a storage device (e.g., drive unit) 816, a signal generation device 818, and a network interface device/transceiver 820 coupled to antenna(s) 830. The machine 800 may include an output controller 834, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, or within the hardware processor 802 during execution thereof by the machine 800. In an example, one or any combination of the hardware processor 802, the main memory 804, the static memory 806, or the storage device 816 may constitute machine-readable media.

While the machine-readable medium 822 is illustrated as a single medium, the term "machine-readable medium" may include a single medium or multiple media (e.g., a centralized or distributed database, and/or associated caches and servers) configured to store the one or more instructions 824.

In at least one embodiment, fingerprinting system 836 refers to software (e.g., running in a containerized environment) that causes the system to generate test case fingerprints from transaction records. In at least one embodiment, fingerprinting system obtains transaction records generated in a production environment. Transaction records may reflect transaction requests/responses that were utilized in transactions processed in a production environment. For example, fingerprinting system may be implemented in accordance with techniques discussed in connection with FIGS. 1-7.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 800 and that cause the machine 800 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device/transceiver 820 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 820 may include one or more physical jacks (e.g., Ethernet, coaxial, or phone jacks) or one or more antennas to connect to the communications network 826. In an example, the network interface device/transceiver 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 800 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, biomedical sensors, wearable devices or sensors, cellular radiotelephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which may be used to store the information and which may be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A computer-implemented method, comprising:
obtaining a plurality of transaction records from a production environment;
parsing transaction input data of a first transaction record of the plurality of transaction records, to identify a first set of fields for fingerprinting the first transaction record;
determining a first set of parameter values for the first set of fields in the transaction input data;
determining, based on the transaction input data, intermediate transaction data;
parsing the intermediate transaction data to identify a second set of fields for the fingerprinting of the first transaction record;
determining a second set of parameter values for the second set of fields in the intermediate transaction data;
parsing transaction output data of the first transaction record to identify a third set of fields for the fingerprinting of the first transaction record;
determining a third set of parameter values for the third set of fields in the transaction output data;
determining a first representation of the first transaction record comprising:
the first set of parameter values;
the second set of parameter values; and
the third set of parameter values;
computing, using a hash function and based on the first representation of the first transaction record, a first fingerprint of the first transaction record;
querying a first database to determine whether the first fingerprint was previously generated by another transaction record;
based on determining that the first fingerprint was not previously generated by another transaction record;
storing, in a second database, the first fingerprint and the first representation of the first transaction record; and
storing, in the second database, the first fingerprint and the first transaction record;
receiving a request to perform a regression test.

2. The computer-implemented method of claim 1, further comprising:
determining a first query for fingerprints that match a filter criteria;
submitting the first query to the first database;
obtaining, from the first database, a plurality of fingerprints;
determining a second query for transaction records that match the plurality of fingerprints;
submitting the second query to the second database;
obtaining, from the second database, a second plurality of transaction records;
replaying a plurality of transaction records based on the second plurality of transaction records;
recording results of replaying the second plurality of transaction records; and
validating the results.

3. The computer-implemented method of claim 2, wherein validating the results comprises comparing the transaction output data with a second output of the results.

4. The computer-implemented method of claim 1, further comprising:
storing the plurality of transaction records in a network-accessible location;
generating a notification that the plurality of transaction records are available for processing; and
provisioning a container for computing a plurality of fingerprints for the plurality of transaction records.

5. A system, comprising:
one or more processors; and
memory storing executable instructions that, as a result of execution by the one or more processors, cause the system to:
obtain a first transaction record corresponding to a first request that was processed, wherein the first transaction record comprises a first set of fields and a corresponding first set of parameter values;
identify one or more fields of the first set of fields for fingerprinting;
determine one or more parameter values of the first set of parameter values that correspond to the one or more fields;
determine, based on the one or more parameter values, a first representation of the first transaction record;
determine, based on the first representation of the first transaction record, a first fingerprint, wherein the first fingerprint is determined using a hash function with the first representation as a hash input to the hash function, and wherein the first fingerprint is a hash output of the hash function;
query a first database to determine whether the first fingerprint was previously generated by another transaction record; and
based on determining that the first fingerprint was not previously generated by another transaction record, store the first representation in association with the first fingerprint; and
store the first transaction record in association with the first fingerprint.

6. The system of claim 5, wherein the executable instructions include further instructions that, as a result of execution by the one or more processors, further cause the system to:
determine a first field of the one or more fields;
determine a first parameter value of the first field;
determine a calculated value based on the first parameter value; and
wherein the first representation of the first transaction record comprises the calculated value.

7. The system of claim 6, wherein:
the first field is an address field;
the first parameter value comprises address information; and
the calculated value comprises jurisdiction information determined based on the address information.

8. The system of claim 5, wherein the one or more fields comprises:
an input field of the first transaction record;
an intermediate field of the first transaction record; and
an output field of the first transaction record.

9. The system of claim 5, wherein the executable instructions include further instructions that, as a result of execution by the one or more processors, further cause the system to:
determine a first query for fingerprints that match one or more filter criteria;
submit the first query to the first database;
obtain, from the first database, a plurality of fingerprints;
determine a second query for transaction records that match the plurality of fingerprints;
submit the second query to a second database;
obtain, from the second database, a plurality of transaction records;

replay a plurality of transactions based on the plurality of transaction records;
record results of replaying the plurality of request transactions; and
validate the results.

10. The system of claim 9, wherein the executable instructions include further instructions that, as a result of execution by the one or more processors, further cause the system to:
deploy a code update to a test environment;
wherein the plurality of requests transaction records are replayed in the test environment; and
wherein the results are validated based on a comparison between outputs produced by replaying the plurality of transaction records and original outputs of the plurality of transaction records.

11. The system of claim 5, wherein the executable instructions include further instructions that, as a result of execution by the one or more processors, further cause the system to:
obtain a second transaction record corresponding to second transaction that was processed, wherein the second transaction record comprises a second set of fields and a corresponding second set of parameter values;
identify one or more fields of the second set of fields for fingerprinting;
determine second one or more parameter values of the second set of parameter values that correspond to the one or more fields of the second set of fields;
determine, based on the second one or more parameter values, a second representation of the second transaction record;
determine, based on the second representation of the second transaction record, a second fingerprint;
determine that the second fingerprint matches the first fingerprint;
determine a number of test samples for the first fingerprint that are stored in a database;
determine the number of test samples is less than a threshold; and
based on the second fingerprint matching the first fingerprint and the number of test samples being less than the threshold:
store the second representation in association with the second fingerprint; and
store the second transaction record in association with the second fingerprint.

12. A non-transitory computer-readable storage medium storing executable instructions that, as a result of being executed by one or more processors of a computer system, cause the computer system to at least:
obtain a first transaction record comprising a set of fields and a corresponding set of parameter values;
identify one or more fields of set of fields for fingerprinting;
determine one or more parameter values of the set of parameter values that correspond to the one or more fields;
determine, based on the one or more parameter values, a first representation of the first transaction record;
determine, based on the first representation of the first transaction record, a first fingerprint, wherein the first fingerprint is determined using a hash function with the first representation as a hash input to the hash function, and wherein the first fingerprint is a hash output of the hash function;

query a first database to determine whether the first fingerprint was previously generated by another transaction record; and
based on determining that the first fingerprint was not previously generated by another transaction record,
store the first representation in association with the first fingerprint; and
store the first transaction record in association with the first fingerprint.

13. The non-transitory computer-readable storage medium of claim 12, wherein the executable instructions include further instructions that, as a result of execution by the one or more processors, further cause the system to:
determine a first field of the one or more fields;
determine a first parameter value of the first field;
determine a calculated value based on the first parameter value; and
wherein the first representation of the first transaction record comprises the calculated value.

14. The non-transitory computer-readable storage medium of claim 13, wherein:
the first field is an address field;
the first parameter value comprises address information; and
the calculated value comprises jurisdiction information determined based on the address information.

15. The non-transitory computer-readable storage medium of claim 12, wherein the one or more fields comprises:
an input field of the first transaction record;
an intermediate field of the first transaction record; and
an output field of the first transaction record.

16. The non-transitory computer-readable storage medium of claim 12, wherein the executable instructions include further instructions that, as a result of execution by the one or more processors, further cause the system to:
determine a first query for fingerprints that match one or more filter criteria;
submit the first query to a first database;
obtain, from the first database, a plurality of fingerprints;
determine a second query for transaction records that match the plurality of fingerprints;
submit the second query to a second database;
obtain, from the second database, a plurality of transaction records;
replay a plurality of transaction based on the plurality of transaction records;
record results of replaying the plurality of transaction; and
validate the results.

17. The non-transitory computer-readable storage medium of claim 16, wherein the executable instructions include further instructions that, as a result of execution by the one or more processors, further cause the system to:
deploy a code update to a test environment;
wherein the plurality of transaction requests are replayed in the test environment; and
wherein the results are validated based on a comparison between outputs produced by replaying the plurality of transaction records and original outputs of the plurality of transaction records.

18. The non-transitory computer-readable storage medium of claim 12, wherein the executable instructions include further instructions that, as a result of execution by the one or more processors, further cause the system to:
obtain a second transaction record corresponding to second transaction that was processed, wherein the transaction record comprises a second set of fields and a corresponding second set of parameter values;

identify one or more fields of the second set of fields for fingerprinting;

determine second one or more parameter values of the second set of parameter values that correspond to the one or more fields;

determine, based on the second one or more parameter values, a second representation of the second transaction record;

determine, based on the second representation of the second transaction record, a second fingerprint;

determine that the second fingerprint matches the first fingerprint; and based on the second fingerprint matching the first fingerprint, discard the second fingerprint.

\* \* \* \* \*

UNITED STATES PATENT AND TRADEMARK OFFICE
CERTIFICATE OF CORRECTION

PATENT NO. : 11,989,118 B1
APPLICATION NO. : 17/541967
DATED : May 21, 2024
INVENTOR(S) : Michael Sutton et al.

It is certified that error appears in the above-identified patent and that said Letters Patent is hereby corrected as shown below:

In the Claims

Claim 10 at Column 27, Line 11 should read:
-- wherein the plurality of transaction records are --.

Signed and Sealed this
Ninth Day of July, 2024

Katherine Kelly Vidal
*Director of the United States Patent and Trademark Office*